United States Patent

[11] 3,599,630

[72] Inventors: Masaaki Sato; Nobuo Yamashita, both of Tokyo, Japan
[21] Appl. No.: 866,412
[22] Filed: Sept. 15, 1969
[45] Patented: Aug. 17, 1971
[73] Assignee: Olympus Optical Company, Ltd. Tokyo, Japan
[32] Priority: Apr. 10, 1968, May 4, 1967, May 4, 1967, May 4, 1967, Sept. 21, 1967, Oct. 15, 1968
[33] Japan
[31] 43/28346, 42/36883, 42/36882, 42/36884, 42/80172 and 43/74605
Continuation-in-part of application Ser. No. 725,317, Apr. 30, 1968, now abandoned.

[54] AUTOMATIC EXPOSURE CONTROL DEVICE IN AN ENDOSCOPE
15 Claims, 32 Drawing Figs.

[52] U.S. Cl. .................................. 128/6, 95/11 HC, 95/11.5, 95/61, 352/210
[51] Int. Cl. ........................................ A61b 1/04
[50] Field of Search .............................. 128/4, 6; 95/11.5, 53, 55, 59, 11 HC, 61; 352/208, 210

[56] References Cited
UNITED STATES PATENTS
3,200,723  8/1965  Topaz ........................... 95/11.5
3,329,074  7/1967  Gosselin ....................... 95/11

*Primary Examiner*—Richard A. Gaudet
*Assistant Examiner*—G. F. Dunne
*Attorney*—Kurt Kelman ABSTRACT: Automatic exposure control device in an endoscope adapted to photograph an object illuminated by the light emanating from the forward end of a light conducting optical system which extends in the endoscope and receives light from an external light source at its rearward end on a film loaded in the endoscope, the light from the object being transmitted through an image transmitting optical system of the endoscope. The light quantity for photographing the object is controlled by means of an exposure control circuit provided in the device to which a photoelectric element receiving the light from the object supplies a signal indicative of the intensity of the light incident to the photoelectric element for obtaining the proper exposure of the film.

3,599,630

INVENTOR
MASAAKI SATO
NOBUO YAMASHITA

BY Kurt Kelman
AGENT

INVENTOR

MASAAKI SATO
NOBUO YAMASHITA

BY Kurt Kelman
AGENT

Fig. 11
Fig. 12
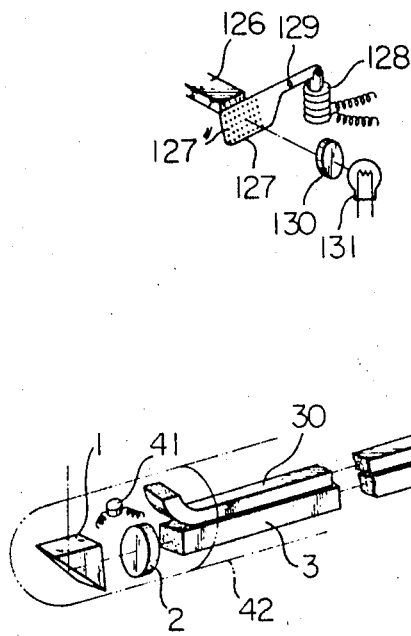
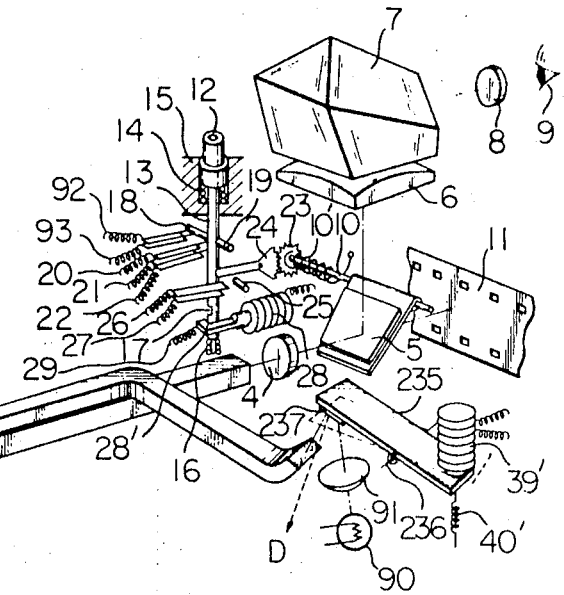
Fig. 13
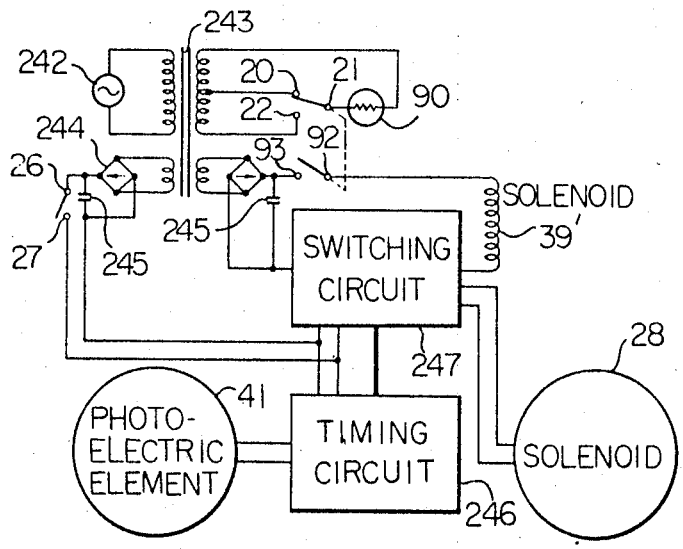
INVENTOR
MASAAKI SATO
NOBUO YAMASHITA
BY  Kurt Kelman
AGENT INVENTOR
MASAAKI SATO
NOBUO YAMASHITA
BY Kurt Kelman
AGENT

AUTOMATIC EXPOSURE CONTROL DEVICE IN AN ENDOSCOPE

CROSS-REFERENCE TO RELATED APPLICATION

This application is a continuation-in-part application of U.S. Pat application Ser. No. 725,317 filed by one of the coinventors of this application on Apr. 30, 1968, now abandoned.

BACKGROUND OF THE INVENTION

The present invention relates to a novel and useful automatic exposure control device of an endoscope for photographing an object by using the light supplied from an external light source.

The intensity of the light supplied from the external light source and illuminating the object can be reduced for the observation of the object by the operator while the intensity of the light is raised and the duration of the illumination of the object is controlled by an exposure control circuit in the automatic exposure control device to which a photoelectric element receiving the light from the object supplies the signal indicative of the intensity of the light received by said photoelectric element for obtaining the proper exposure of the film.

The intensity of the light from the object for the observation thereof is manually controlled while the light quantity for the exposure of the film is properly controlled by the automatic exposure control device in order to obtain the proper exposure of the film.

The photoelectric element may be adapted to receive a portion of the light divided from that to be directed to the film for the exposure thereof, the spectroscopic characteristics of the light to be received by the photoelectric element being selected to have wavelengths greater than those of the visible light while the photoelectric element is selected to be of the type having its maximum sensitivity in the range of wavelengths of the infrared light so that the photoelectric element can be actuated most efficiently while substantial loss of the light effective for the exposure of the film is prevented.

Heretofore, the exposure of the film in an endoscope was controlled by varying the voltage of the electric power supplied to the lamp for illuminating the object. This is disadvantageous because the color temperature varies so that high quality of the image of the object can not be obtained, particularly when a color film is used.

When separate light sources for observing the object and for the exposure of the film are used, a long time is required for deenergizing the lamp for the observation purpose and energizing the lamp for the exposure of the film when a reflecting mirror incorporated in the endoscope is swung to its position for the exposure of the film.

On the other hand, when a single common light source is used for both the observation of the object and the exposure of the film, there is no means for intercepting the light during the time the intensity of the light is raised for the exposure of the film, i.e. the color temperature is varied, so that a high quality of the image of the object can not be obtained. The frequent variation in the voltage supplied to the lamp also shortens the life of the lamp.

An endoscope is well known in which the exposure of the film is controlled by an exposure control means in the endoscope which is supplied with a signal indicative of the intensity of light from the object for the proper exposure of the film by a photoelectric element attached to a beam splitter located in the optical path directed to the film so that a portion of the light to be used in the exposure of the film is divided so as to be received by the photoelectric element. Such an endoscope is particularly useful for an endoscope for inspection of bronchi of a human body and the like, because the diameter of the forward end portion of the endoscope to be inserted into a hollow portion to be inspected can be made small in comparison with an endoscope in which the photoelectric element is located in the forward end portion of the endoscope in order to directly receive the light from the object. However, when the photoelectric element is attached to a beam splitter so as to receive a portion of the light divided thereby from the light to be used in the exposure of the film, only a fraction of light from the object is used for actuating the photoelectric element thereby deteriorating the S/N ratio of the photoelectric element and requiring the greater magnification of the output of the photoelectric element so that the accuracy is lowered due to the drift thereof while the quantity of light to be used in the exposure of the film is decreased so that the quality of the image obtained on the film is deteriorated.

The present invention aims at avoiding the above described disadvantages of the prior art endoscope.

SUMMARY OF THE INVENTION

One object of the present invention is to provide a novel and useful automatic exposure control device in an endoscope of the type described above in which the spectroscopic characteristics of a portion of light divided from the light to be used in the exposure of the film and directed to a photoelectric element provided in the exposure control device for the actuation thereof are selected to have wave lengths most effective for actuating the photoelectric element of an appropriate property but substantially ineffective for the exposure of the film so that the photoelectric element is most effectively actuated for the proper exposure of the film without causing any substantial loss of the quantity of light used in the exposure of the film.

In accordance with the present invention, a light conducting fiber optical system is provided in the endoscope extending from the forward end portion thereof toward the control housing, and the rearward end of the light conducting fiber optical system receives the light from an external light source, and the light thus received by the light conducting fiber optical system is transmitted therethrough to the forward end thereof so as to be emanated therefrom for illuminating the object. Means is provided adjacent to the rearward end of the light conducting fiber optical system for controlling the duration of the illumination of the object by the light directed to the light conducting fiber optical system from the external light source, a photoelectric element being provided to supply to the controlling means a signal indicative of the intensity of the light received by the photoelectric element thereby permitting the duration of the illumination to be controlled for proper exposure of the film in accordance with the signal of said photoelectric element indicative of the intensity of the light.

Further, in the automatic exposure control device of the present invention, the photoelectric element may be attached to a beam splitter located in the optical path for the exposure of the film so that a portion of the light used in the exposure of the film is divided so as to be received by the photoelectric element. The spectroscopic characteristics of the beam splitter are so determined that a light having wavelengths greater than those of the visible light is divided and directed to the photoelectric element which has its maximum sensitivity in the range of wave lengths of the infrared light while the remaining portion of the light is directed to the film for the exposure thereof so that the photoelectric element is actuated most effectively without causing any substantial loss of the quantity of light used in the exposure of the film.

Other features of the present invention will be described in detail hereinbelow.

BRIEF DESCRIPTION OF THE DRAWINGS

FIG. 11 is a fragmentary perspective view showing a modification of the light intercepting blade shown in FIG. 9, FIG. 12 is a schematic perspective view showing a further embodiment of the automatic exposure control device of an endoscope constructed in accordance with the present invention, FIG. 13 is a diagram showing tee electric circuit used in the device of FIG. 12.

DETAILED DESCRIPTION OF THE INVENTION

Figure 1:
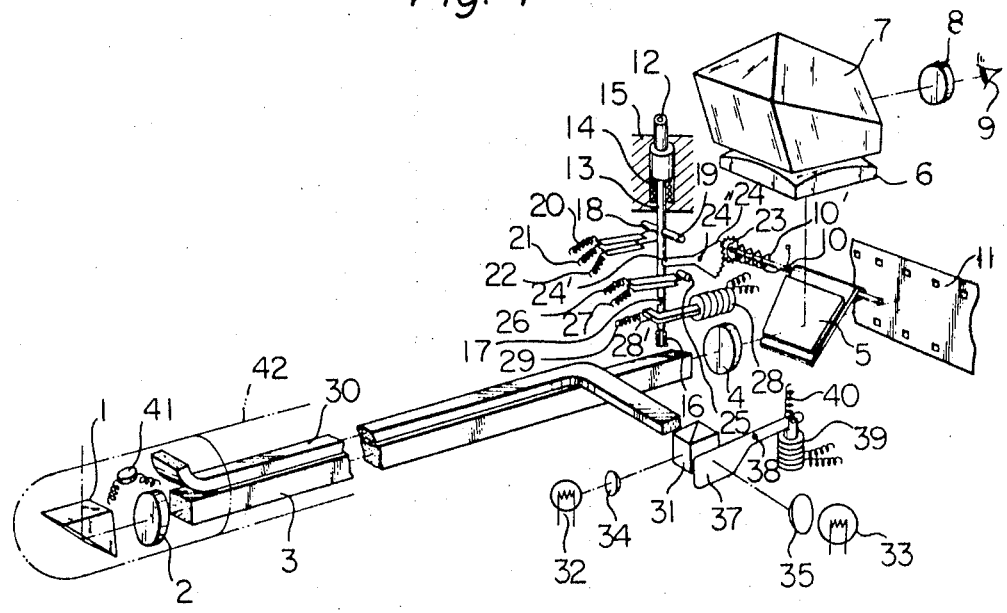
FIG. 1 is a schematic perspective view showing the main part of an embodiment of the automatic exposure control device of an endoscope constructed in accordance with the present invention.

The endoscope shown in FIG. 1 comprises an elongated sheath 42 and a control housing, not shown, to which the rear end of sheath 42 is connected. Reflecting prism or reflecting mirror 1 is provided at the forward end of sheath 42 for receiving the light from an object positioned at the side of the forward end of sheath 42. Objective lens 2 is provided in the forward end of sheath 42 behind prism 1 for focusing an image of the object on the forward end surface of image transmitting optical system 3 such as a fiber optical system which extends through said sheath 42 into the control housing. Objective lens 4, swingable reflecting mirror 5, a film advancing mechanism, not shown, for transporting film 11 by one frame each time the exposure of film 11 is effected, an automatic exposure control device of the film as described below, frosted glass plate 6, reflecting prism 7, such as a pentagonal prism, and ocular 8 are provided in the control housing. The arrangement of the above described elements is conventional, except the automatic exposure control device of the film and, therefore, is not described in detail. The image formed on the forward end surface of image transmitting optical system 3 and transmitted to the rear end surface thereof is normally focused on frosted glass plate 6 through objective lens 4 and reflecting mirror 5 when it is in the viewing position, and the image formed on frosted glass plate 6 is viewed by eye 9 of the operator through prism 7 and ocular 8. When the automatic exposure control device is actuated, mirror 5 is rotated from its viewing position to its film exposing position and a light intercepting blade in the automatic exposure control device is actuated for exposure of the film as described below. Light conducting fiber optical system 30 extends from the control housing through sheath 42 to the forward end thereof as shown. The light from lamp 32 which is used for the observation of the object is directed to the rear end surface of light conducting fiber optical system 30 through condenser lens 34 and semitransparent reflecting prism 31 for the observation of the object. The light is transmitted through light conducting fiber optical system 30 to the forward end surface thereof and emanated therefrom for illuminating the object. The light from lamp 33 which is used for the exposure of the film is directed in place of the light from lamp 32 to the rear end surface of light conducting fiber optical system 30 through condenser lens 35 and semitransparent reflecting prism 31 when light intercepting blade 37 interposed therebetween is moved out of the optical path between lamp 33 and the rear end of light conducting fiber optical system 30 in timed relationship to the actuation of mirror 5 by the actuation of the automatic exposure control device of the present invention for the exposure of the film. The light transmitted through light conducting fiber optical system 30 to the forward end thereof is emitted therefrom to illuminate the object and the light reflected from the object is received by objective lens 2 through prism 1 to form an image of the object on the forward end surface of image transmitting fiber optical system 3 so that the film is exposed for obtaining the image of the object thereon.

Now the construction of the automatic exposure control device of the present invention will be described in detail.

Release button 12 of the operating mechanism is slidably fitted in wall 15 of the control housing and urged upwardly by means of spring 14 as shown. The upper end of release rod 13 which is also urged upwardly by means of spring 16 releasably abuts against the lower end of release button 12 as shown. Switch contacts 20, 21, 22 are located beneath pin 18 fixedly secured to release rod 13 at an appropriate distance spaced therefrom. Contact 21 normally contacts contact 20 but when release button 12 is depressed and release rod 13 is moved downwardly, pin 18 urges contact 21 downwardly so as to be disengaged from contact 20 and contacted with contact 22. Another pin 19 is fixedly secured to release rod 13. Outer end 24' of sector gear 24 which is rotatable about axis 24'' is positioned below said pin 19 spaced distance therefrom greater than that between pin 18 and contact 21. As shown, sector gear 24 meshes with pinion 23 secured to the outer end of shaft 10 on which mirror 5 is mounted, so that when release button 12 is depressed and release rod 13 is moved downwardly, pin 19 secured to release rod 13 abuts against outer end 24' of sector gear 24 after pin 18 has contacted with contact 21 so as to switch contacts 20, 21, 22, thereby rotating sector gear 24 in the anticlockwise direction. The rotation of sector gear 24 causes pinion 23 to rotate in the clockwise direction together with shaft 10 thereby swinging mirror 5 from its normal light reflecting viewing position to the film exposing position at which the exposure of the film is effected. Spring 10' is provided around shaft 10 urges shaft 10 in the anticlockwise direction, so that, when release rod 13 returns to its initial position, mirror 5 is swung to its initial light reflecting position as shown in FIG. 1 by the action of spring 10'. Stopper 25 is provided to limit the rotation of sector gear 24, and hence, the downward movement of release rod 13. Contacts 26 and 27 are so located adjacent to stopper 25 that contacts 26, 27 are closed by outer end 24' of sector gear 24 just before the movement of the latter is stopped by means of stopper 25. Solenoid 28 is provided adjacent to the lower part of release rod 13, and latch 28' is provided at the outer end of the core of solenoid 28. Spring 29 attached at its one end to latch 28' and at its other end to a stationary portion in the control housing normally urges the core of solenoid 28 to its leftmost position and, when solenoid 28 is energized, the core is retracted to its rightmost position against the action of spring 29. Cutout portion 17 is provided in the lower part of release rod 13. The position of said cut out portion 17 is so determined that, when release button 12 is depressed so that release rod 13 is moved downwardly and solenoid 18 is energized as described hereinafter, latch 28' of the core of solenoid 28 engages with cut out portion 17 or release rod 13 thereby arresting the same in its downwardly moved position even after release button 12 is released until solenoid 28 is deenergized. As shown in FIG. 1, lamp 33 for illuminating the object for the exposure of film 11 is provided in the optical axis of the rear end surface of light conducting fiber optical system 30. Condenser lens 35 and semitransparent reflecting prism 31 are located in the optical axis intermediate the rear end surface of light conducting fiber optical system 30 and lamp 33 as shown. Lamp 32 for illuminating the object for the observation purpose is so located that the light from lamp 32 is directed through condenser lens 34 to prism 31 at right angle to the optical axis of the rear end surface of light conducting fiber optical system 30 so that the light received by prism 31 is reflected thereby toward the rear end surface of light conducting fiber optical system 30. Swingable light intercepting blade 37 is located adjacent to prism 31 between the same and lamp 33. Light intercepting blade 37 is pivoted about shaft 38 and the outer end of blade 37 opposite to the portion thereof facing to prism 31 is pivotably connected to the upper end of the core of solenoid 39. One end of spring 40 is secured to said outer end of blade 37 and the other end of spring 40 is secured to a stationary portion in the control housing, so that blade 37 is normally urged to the light intercepting position at which blade 37 prevents the light emanating from lamp 33 from entering prism 31. When solenoid 39 is energized, the core of solenoid 39 is moved downwardly against the action of spring 40 so that blade 37 is swung clockwise thereby permitting the light from lamp 33 to enter prism 31. Light intercepting blade 37 is preferably made of a thin sheet of titanium metal in order to maintain sufficient strength at the high temperature generated by lamp 33.

A photoelectric element 41 used in the electric circuit of the automatic exposure control device is provided in the forward end of sheath 42 adjacent to prism 1, objective lens 2 and the forward end of light conducting fiber optical system 30.

Figure 3:
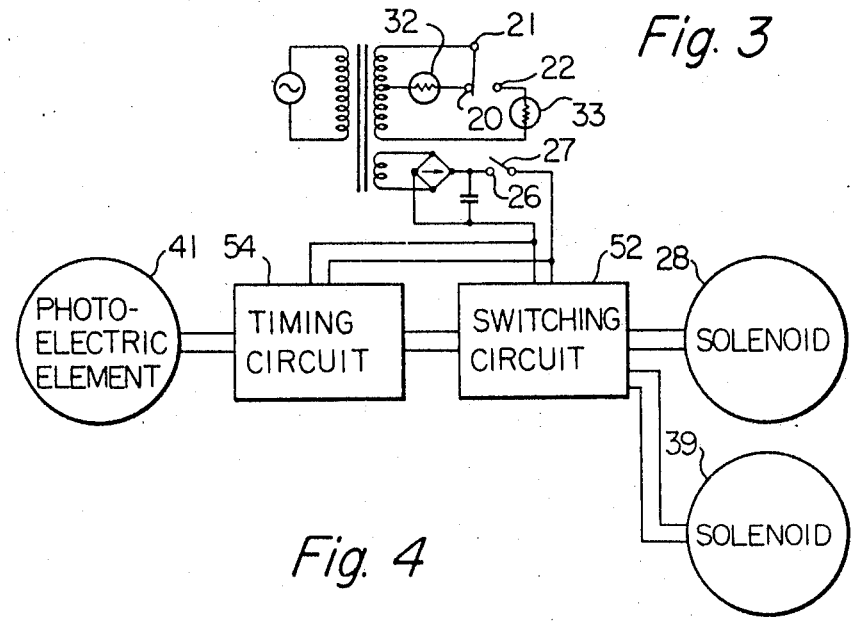
FIG. 3 is a diagram showing an embodiment of the electric circuit of the automatic exposure control device of FIG. 1.

The electric circuit of the automatic exposure control device shown in FIG. 1 is shown in FIG. 3. The electric circuit comprises a transformer for supplying electric power to lamps 32 or 33 through contacts 20, 21, 22 and to a rectifier for energizing timing circuit 54 and switching circuit 52 through contacts 26, 27, photoelectric element 41 being connected to timing circuit 54 which is in turn connected to switching circuit 52. Switching circuit 52 is connected to solenoid 28 and solenoid 39, respectively. The operation of the electric circuit shown in FIG. 3 is as follows. When the endoscope is used for observation, contacts 20 and 21 are closed before release button 12 is actuated, thereby energizing lamp 32 so that the light from lamp 32 is transmitted through light conducting fiber optical system 30 and illuminates the object. When the exposure of film 11 is to be effected, release button 12 is depressed thereby moving release rod 13 downwardly so that contact 21 is disengaged from contact 20 and contacts contact 22 by the movement of pin 18 secured to release rod 13. Therefore, lamp 32 is deenergized while lamp 33 is energized.

Of course, the intensity of the light emanating from lamp 33 is selected to be significantly greater than that of lamp 32 in order to obtain a high quality sharp image of the moving object formed on the film by allowing the time of exposure of the film to be shortened.

When release rod 13 is further moved downwardly after the closure of contacts 21 and 22, pin 19 secured to release rod 13 urges outer end 24' of sector gear 24 downwardly so as to rotate the same in the anticlockwise direction and to cause contacts 26 and 27 to be closed, and finally, the rotation of sector gear 24 is stopped by stopper 25. The rotation of sector gear 24 causes pinion 23 to rotate in the clockwise direction together with shaft 10 on which mirror 5 is mounted, so that mirror 5 is moved to the film exposing position for the exposure of film 11. Closure of contacts 26, 27 causes solenoid 28 to be energized so that latch 28' of the core of solenoid 28 engages with cutout portion 17 of release rod 13 which is now in its lowermost position thereby arresting release rod 13 in its lowermost position until solenoid 28 is deenergized. Closure of contacts 26, 27 also causes solenoid 29 to be energized so that light intercepting blade 37 is moved out of the optical path extending between lamp 35 and the rear end of light conducting fiber optical system 30, thereby permitting the light from lamp 33 to pass through prism 31 toward light conducting fiber optical system 30. Since the closure of contacts 21, 22 and hence, the energization of lamp 33 takes place sufficiently in advance of the closure of contacts 26, 27 and hence, the removal of blades 37 out of the optical axis of prism 31, the color temperature of the light emanating from lamp 33 has been made stable before the exposure of the film is commenced.

Photoelectric element 41 receives the light from the object which is now illuminated by the light from lamp 33 and produces a signal in response to the intensity of the light received by photoelectric element 41. The signal thus produced in photoelectric element 41 is supplied to timing circuit 54 so as to charge a condenser provided therein for determining the timing of actuation of switching circuit 52 for the proper exposure of film 11 in accordance with the signal from photoelectric element 41 and the time constant set in timing circuit 54. After the expiration of the time thus determined in timing circuit 54, the condenser in timing circuit 54 is discharged to actuate switching circuit 52 thereby deenergizing solenoids 28 and 39 so that latch 28' disengages from cutout portion 17 of release rod 13 so as to return the same to its initial uppermost position by the action of spring 16 and light intercepting blade 37 is moved into the optical path between lamp 33 and prism 31 so as to terminate the illumination of the object by means of lamp 33 after the proper exposure of film 11 as set by timing circuit 54 in response to the signal from photoelectric element 41. When release rod 13 is moved upwardly, sector gear 24 rotates in the clockwise direction together with the rotation of pinion 23 meshing therewith in the anticlockwise direction by virtue of spring 10' urging shaft 10 mounting thereon pinion 23 as well as mirror 5 in the anticlockwise direction, so that mirror 5 is swung to its initial light reflecting viewing position. At the same time, upward movement of release rod 13 opens contacts 21, 22 and closes contacts 20, 21, because pin 18 secured to release rod 13 disengages from contact 21, so that lamp 33 is deenergized while lamp 32 is energized for the observation of the object.

Figure 2:
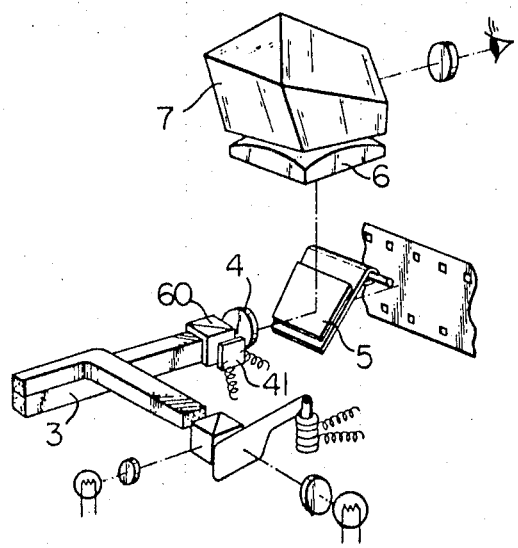
FIG. 2 is a fragmentary perspective view showing another embodiment of FIG. 1.

Photoelectric element 41 may be located at the side of semitransparent prism 60 located at the rear end surface of image transmitting optical system 3 as shown in FIG. 2.

Figure 4:
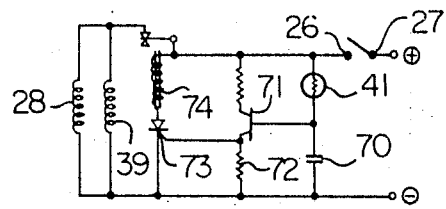
FIG. 4 is a diagram showing the timing circuit and the switching circuit used in the circuit of FIG. 3.

FIG. 4 shows an embodiment of the timing circuit shown in FIG. 3. The timing circuit is constituted by a photoelectric element 41 such as a CdS element, condenser 70, an electric power source having contacts 26, 27, double base diode 71, resistance 72, silicon control element (ScR) 73, relay 74 and solenoids 28, 39 connected as shown in FIG. 4.

In this timing circuit, the resistance of element 41 which is variable in response to the intensity of the light received by element 41 is used for determining the time constant to be set in the timing circuit by means of condenser 70 when contacts 26, 27 are closed. After the expiration of the time period determined in the timing circuit, double base diode 71 produces pulses between two terminals of resistance 72, and these pulses render silicon control element (ScR) 73 to be electrically conductive thereby energizing relay 74 so that solenoids 28, 39 are deenergized.

The circuit shown in FIG. 3 requires particular switch means actuated by the operation of release button 12. When the exposure control of the film is to be effected in accordance with the present invention by using a conventional single lens reflex camera having synchronizing contacts, an electric circuit such as shown in FIG. 5 is used.

Figure 5:
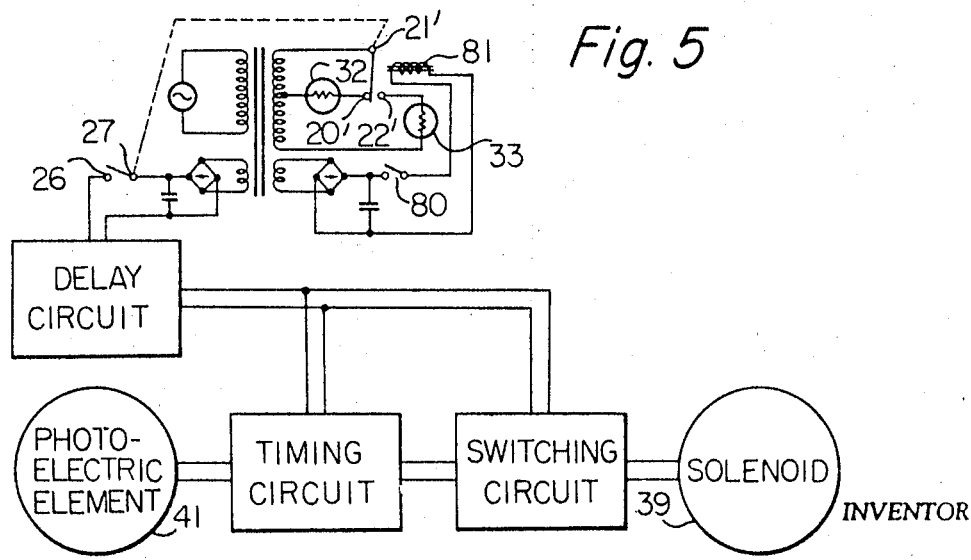
FIG. 5 is a diagram showing an embodiment of the electric circuit of the automatic exposure control device of the present invention when the synchronizing contacts of a conventional signal lens reflex camera are used for operating the circuit.

This circuit is similar to that shown in FIG. 3 except that the transformer supplies electric power to a further rectifier connected in a circuit having relay 81 for actuating contacts 20', 21', 22' similar in operation to contacts 20, 21, 22 in FIG. 3 and synchronizing contacts 80 of the conventional single lens reflex camera and a condenser, and that a delay circuit is connected between the timing and switching circuits and the rectifier which supplies electric power to the timing and switching circuits through contacts 26, 27, and that contacts 26, 27 are closed in connection with the actuation of relay 81 as shown be broken line in FIG. 5, solenoid 28 being omitted in this circuit. In operation, when synchronizing contacts 80 are closed, relay 81 is energized so that contact 21' is disengaged from contact 20' and contacts contact 22' thereby deenergizing lamp 32 while 33 is energized. At the same time, contacts 26, 27 are closed thereby energizing the timing and switching circuits through the delay circuit so that solenoid 39 is energized after a predetermined time period determined by the delay circuit so as to move light intercepting blade 37 out of the optical path between lamp 33 and prism 31. Thus the light from lamp 33 is supplied to light conducting fiber optical system 30 for the exposure of the film. The delay circuit assures that light intercepting blade 37 is actuated after the color temperature of the light emanating from lamp 33 has been made stable by virtue of the time lag of the actuation of blade 37 after the energization of lamp 33. The signal from photoelectric element 41 which receives the light from the object illuminated by the light from lamp 33 is supplied to the timing circuit and the switching circuit deenergizes solenoid 39 after the predetermined time period set by the timing circuit thereby moving blade 37 by the action of spring 40 to intercept the optical path between lamp 33 and prism 31 for obtaining the proper exposure of film 11.

After the completion of the proper exposure of film 11, the reflecting mirror and the shutter of the camera are returned to their initial positions and synchronizing contacts 80 are opened so that relay 81 is deenergized to switch contacts 20', 21', 22' thereby permitting lamp 32 for observation to be energized by the closure of contacts 20', 21' while lamp 33 is deenergized by the opening of contacts 21', 22'.

It is advantageous to set the shutter speed to a sufficiently long shutter speed when a conventional single lens reflex camera is used in order to assure that light intercepting blade 37 is moved to its light intercepting position before the shutter of the camera is closed.

Figure 6:
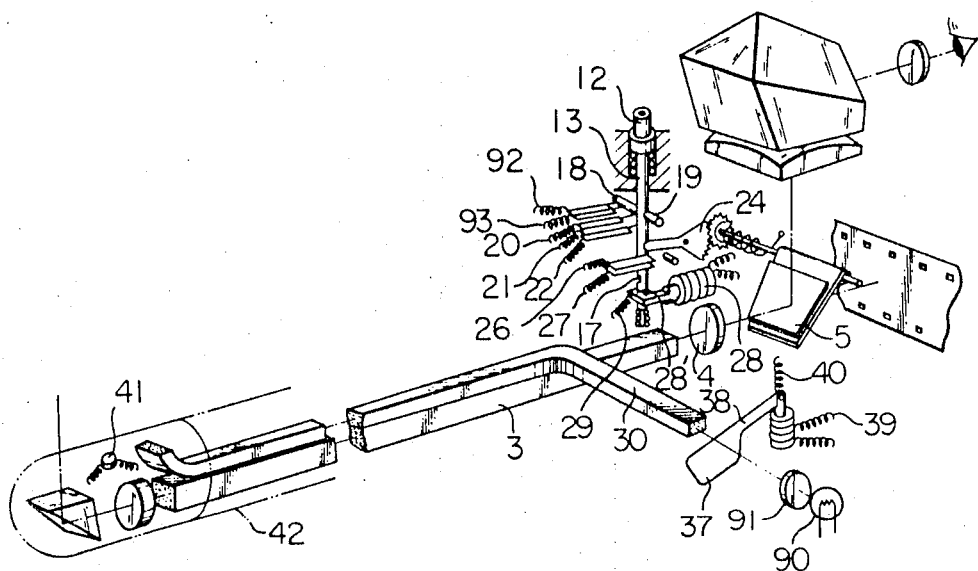
FIG. 6 is a schematic perspective view of another embodiment of the automatic exposure control device of an endoscope in accordance with the present invention.
Figure 7:
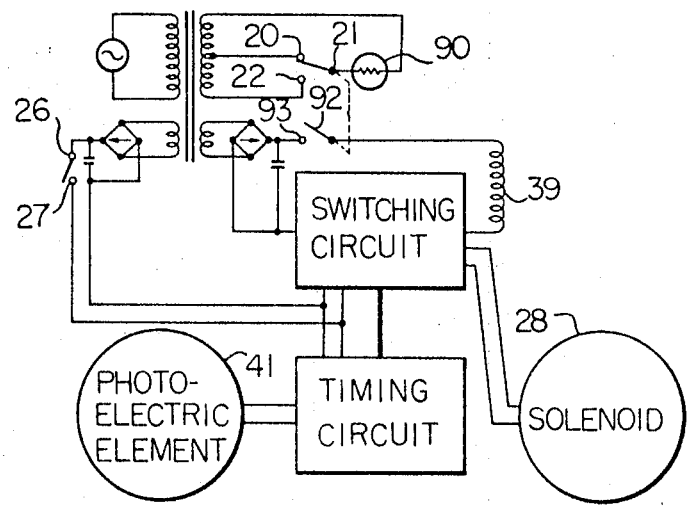
FIG. 7 is a diagram showing an embodiment of the electric circuit used in the device of FIG. 6.

FIG. 6 shows another embodiment of the present invention. This embodiment is similar to that shown in FIG. 1 except that a common single light source 90 is used in place of the separate two lamps for viewing and film exposing purposes as shown in FIG. 1, and common lamp 90 is energized with electric power of lower voltage during the observation of the object while the voltage of the electric power supplied to lamp 90 is raised during the timer period for the exposure of the film by switching means described hereinafter. In this embodiment, light intercepting blade 37 is normally located out of the optical path between lamp 90 and the rear end of light conducting fiber optical system 30 so that the light from lamp 90 for the observation of the object is normally directed to light conducting fiber optical system 30 with light reflecting mirror 5 held in its viewing position. However, when the exposure of the film is to be effected, blade 37 is first moved into the optical path to intercept the light during the time period in which the intensity of the light of lamp 90 is increased for the exposure of the film and, after mirror 5 is swung to the film exposing position for exposure of the film, blade 37 is again moved out of the optical path for the exposure of the film and, after expiration of a time period determined by the timing circuit of the automatic exposure control device, blade 37 is again moved into the optical path for terminating the exposure of the film. Blade 37 is again moved out of the optical path after the intensity of the light is decreased and mirror 5 is moved to its viewing position for the observation of the object. The electric circuit of the device of FIG. 6 is shown in FIG. 7. As shown in FIGS. 6 and 7, a further set of contacts 92, 93 is provided adjacent to contacts 20, 21, 22. Contacts 92, 93 are closed by the abutment of pin 18 secured to release rod 13 against contact 92 caused by the downward movement of release rod 13. Downward movement of release rod 13 also causes contact 21 to be disengaged from contact 20 and contact 22 as described previously in connection with FIG. 1. In this case, however, closure of contacts 20, 21 supplies electric power of lower voltage to lamp 90 for observation purposes while closure of contacts 21, 22 supplies electric power of higher voltage film exposing purposes because the number of turns of the coil of the transformer supplying electric power to lamp 90 when contacts 22 and 21 are closed is increased in comparison with the number of turns of the coil of the transformer when contacts 20 and 21 are closed. The closure of contacts 92, 93 energizes solenoid 39 as shown in FIG. 7, so that blade 37 is moved into the optical path between lamp 90 and the rear end of light conducting fiber optical system 30 against the action of spring 40. Further downward movement of release rod 13 causes mirror 5 to be swung to the film exposing position for the exposure of film 11 in the same way as previously described in connection with FIG. 1, while contacts 26, 27 are closed thereby energizing the switching circuit shown in FIG. 7 so that solenoid 39 is deenergized to move blade 37 out of the optical path for exposure of film 11 by the action of spring 40 after expiration of sufficient time for energizing lamp 90 with higher voltage and permitting the color temperature to be made stable, said spring 40 being connected to the outer end of blade 37 where the upper end of the core of solenoid 39 is pivotably connected, and, at the same time, solenoid 28 connected to the switching circuit is energized so as to arrest release rod 13 in its lowermost position for the exposure of film 11 by the engagement of latch 28' of the core of solenoid 28 with cutout portion 17 of release rod 13 in the same way as previously described in connection with FIG. 1. After the expiration of the proper exposure time determined by photoelectric element 41 and the timing circuit, the switching circuit is actuated by the timing circuit so as to energize solenoid 39 and deenergize solenoid 28 so that blade 37 is again moved into the optical path to terminate the exposure of film 11 while release rod 13 is allowed to move upwardly by the action of the spring urging rod 13 upwardly thereby effecting in succession the opening of contacts 26, 27, the returning of mirror 5 to its light reflecting viewing position, the switching of contacts 20, 21, 22 to open contacts 21, 22 and close contacts 20, 21, and the opening of contacts 92, 93. The opening of contacts 26, 27 deenergizes the timing and switching circuit while the opening of contacts 21, 22 and closing of contacts 20, 21 reduces the voltage of electric power supplied to lamp 90 so as to reduce the intensity of the light emanating from lamp 90 for observation while the opening of contacts 92, 93 deenergizes solenoid 39 so that blade 37 is returned to its initial position out of the optical path between lamp 90 and the rear end of light conducting fiber optical system 30 thereby admitting the light of low intensity from lamp 90 into light conducting fiber optical system 30 for the observation of the object.

Figure 8:
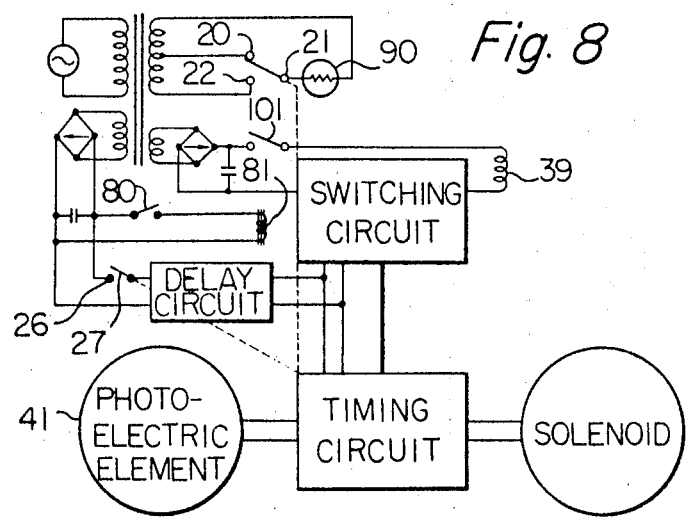
FIG. 8 is a diagram showing another embodiment of the electric circuit in which the synchronizing contacts of a conventional single lens reflex camera are used for operating the circuit.

FIG. 8 shows a modification of the electric circuit of FIG. 7 in which the synchronizing contacts of a conventional single lens reflex camera are used in place of contacts 92, 93 shown in FIG. 7. The electric circuit shown in FIG. 8 is similar in concept to that shown in FIG. 5 except that an additional circuit 101 for energizing solenoid 39 for closing light intercepting blade 37 is added in the circuit actuated by synchronizing contacts 90.

Figure 9:
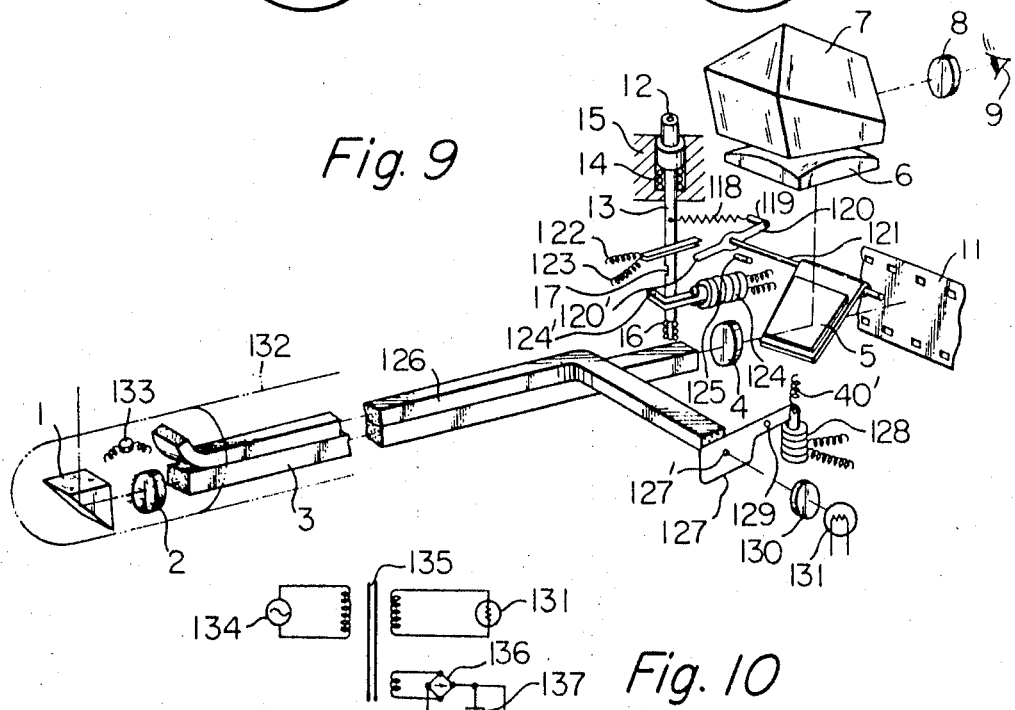
FIG. 9 is a schematic perspective view showing another embodiment of the automatic exposure control device of an endoscope in accordance with the present invention.

FIG. 9 shows another embodiment of the present invention in which a common lamp 131 emanating light of constant intensity is used for both the observation and the photographing of the object. The intensity of the light admitted in light conducting fiber optical system 126 is reduced for observation by interposing a light intercepting blade 127 provided with a small hole 127' in the optical path between lamp 131 and the rear end of light conducting fiber optical system 126 so that only a fraction of the light passing through hole 127' is directed to the rear end surface of light conducting fiber optical system 126 during the observation of the object while light intercepting blade 127 is moved out of the optical path between lamp 131 and the rear end surface of light-conducting fiber optical system 126 in timed relation with the rotation of mirror 5 to the film exposing position for the exposure of film 11 by the operation of the automatic exposure control device for the exposure of film 11.

The device of FIG. 9 is similar in construction to that of FIG. 6 except that light intercepting blade 127 having a small hole 127' therein is normally positioned in the optical path between lamp 131 and the rear end surface of light conducting fiber optical system 126. The light emanating from lamp 131 passes through condenser lens 130 and small hole 127' in blade 127 and is received by the rear end surface of light conducting fiber optical system 126 so that only a fraction of the light from lamp 131 is transmitted to the forward end surface of of light conducting fiber optical system 126 and is emanated therefrom so as to illuminate the object for observation. In this embodiment, one end of spring 118 is attached to release rod 13 while the other end of spring 118 is secured to projection 119 fixedly secured to one end of lever 120 which is in turn fixedly secured to the outer shaft 121 mounting thereon mirror 5. The position of said one spring end attached to release rod 13 is so determined that, when release button 12 is depressed to move release rod 13 downwardly, lever 120 is urged by the action of spring 118 in the clockwise direction until lever 120 is stopped by stopper 125 so that mirror 5 is rotated from its light reflecting viewing position to the film exposing position for the exposure of film 11 while lever 120 is rotated in the anticlockwise direction by the action of spring 18 when release rod 13 is moved upwardly so that mirror 5 is returned to its initial light reflecting viewing position. Contacts 122, 123 are located at positions above other end 120' of lever 120 so that contacts 122, 123 are closed by said other end 120' of lever 120 when release rod 13 is moved downwardly to rotate lever 120 in the clockwise direction so as to rotate mirror 5 to its film exposing position for the exposure of film 11. Release rod 13 is arrested by the engagement of cutout portion 17 thereof with latch 124' when release rod 13 is moved to its lowermost position and solenoid 124 is energized in the same way as in the preceding embodiments. Light intercepting blade 127 is pivoted at 129 and the outer end thereof opposite to the portion facing to the rear end surface of light conducting fiber optical system 126 is connected to the upper end of the core of solenoid 128, one end of spring 40' being connected to said outer end of blade 127 while the other end of spring 40' is secured to a stationary portion in the control housing so that spring 40' normally urges blade 127 to the position at which blade 127 intercepts the optical path between lamp 131 and the rear end surface of light conducting fiber optical system 126 while blade 127 is moved out of the optical path against the action of spring 40' when solenoid 128 is energized in the same way as the embodiment shown in FIG. 1.

Figure 10:
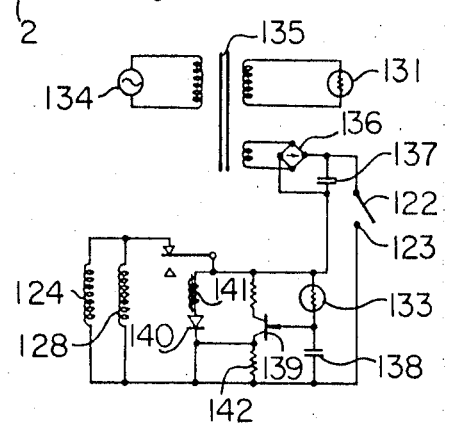
FIG. 10 is a diagram showing the electric circuit used in the device of FIG. 9.

FIG. 10 shows the electric circuit used in the automatic exposure control device of FIG. 9. The electric circuit comprises power source 134 of alternate current, a transformer 135, a rectifier 136, a smoothing condenser 137 located in the circuit to which the electric power is supplied from rectifier 136. Photoelectric element 133, condenser 138, double base diode 139, silicon control element (ScR) 140, relay 141 and resistance 142 are connected in the circuit to which rectifier 136 supplies electric power so as to constitute the timing circuit as illustrated in FIG. 10.

When the endoscope is used for observation of the object, light intercepting blade 127 is positioned in the optical path as shown in FIG. 9, and only a fraction of the light from lamp 131 which passes through hole 127' of blade 127 is directed to the rear end surface of light conducting fiber optical system 126 and transmitted therethrough to the forward end thereof so that the object is illuminated by the light emanating from the forward end of light conducting fiber optical system 126 for observation. For effecting the exposure of film 11, release button 12 is depressed to move release rod 13 downwardly. Thus, mirror 5 is rotated in the clockwise direction to its film exposing position until lever 120 is stopped by stopper 125 for the exposure of film by the action of spring 118 as described previously, and, at the same time, contacts 122, 123 are closed by outer end 120' of lever 120 as described previously. As shown in FIG. 10, the closure of contacts 122, 123 causes solenoids 124, 128 to be energized, so that release rod 13 is arrested in its lowermost position by the engagement of latch 124' of the core of solenoid 124 with cutout portion 17 of release rod 13 by the energization of solenoid 124 and, at the same time, blade 127 is moved out of the optical path against the action of spring 40' by the energization of solenoid 128. Thus, the total light quantity directed to the rear end surface of light conducting fiber optical system 126 from lamp 131 is transmitted to the forward end of light conducting fiber optical system 126 to illuminate the object for the exposure of film 11 while mirror 5 is kept in its film exposing position for the exposure of film 11. At the time of the energization of solenoids 124, 128, condenser 138 is charged in response to the signal supplied from photoelectric element 133, which signal is varied in response to the intensity of the light reflected from the object and received by photoelectric element 133. Therefore, after the expiration of a time period determined by the time constant given by condenser 138 and photoelectric element 138, double base diode 139 produces pulses between the two terminals of resistance 142 thereby rendering silicon control element 140 to be electrically conductive by virtue of said pulses so that relay 141 is energized so as to deenergize solenoids 124, 128 after the proper exposure of film 11 has been effected. By the deenergization of solenoids 124, 128, release rod 13, mirror 5 together with lever 120 and blade 127 are returned to their initial positions for viewing as shown in FIG. 9 and contacts 122, 123 are opened by the disengagement thereof from outer end 120' of lever 120.

FIG. 11 shows a modification of light intercepting blade 127 shown in FIG. 9. In this embodiment, a plurality of very small holes 127'' are provided in blade 127 in substantially uniformly distributed positions. This arrangement of holes 127'' assures uniform distribution of the light over the entire area of the rear end surface of light conducting fiber optical system 126 in comparison with the provision of a single small hole 127' shown in FIG. 9 so that the object is illuminated uniformly when the endoscope is used for observation of the object.

FIG. 12 shows a further embodiment of the present invention which is similar to that shown in FIG. 6 except that magnetically swingable member 235 having mirror 237 attached to one end thereof is provided in place of blade 37 shown in FIG. 6 for intercepting the light admitted to the rear end surface of light conducting fiber optical system 30 by the actuation of electromagnet 39' when the illumination of the object is changed from observation to the exposure of the film and vice versa as described previously in connection with FIGS. 6 and 7.

In this embodiment, magnetically swingable member 235 is pivoted about shaft 236. Mirror 237 is attached to one end of member 235 at the side thereof facing against the rear end surface of light conducting fiber optical system 30 and lamp 90. Spring 40' attached at its one end to the end of member 235 opposite to that to which mirror 237 is attached and secured at its other end to a stationary portion in the control housing normally urges member 235 to a position at which the entire light from lamp 90 to be directed to the rear end surface of light conducting fiber optical system 30 through condenser lens 91 is reflected by mirror 237 and received by the rear end surface of light conducting fiber optical system 30. An electromagnet 39' is provided adjacent to member 235 as shown which, when energized, attracts member 235 and swings it about shaft 236 against the action of spring 40' to a position shown by the broken line in FIG. 12 at which the entire light from lamp 90 is directed outside of the rear end surface of light conducting fiber optical system 30 as shown by the broken line indicated by D.

The electric circuit used in the embodiment of FIG. 12 is shown in FIG. 13 which is similar to that shown in FIG. 7, and the operation of the embodiment of FIG. 12 is similar to that of FIG. 6. Therefore, a detailed description of the electric circuit of FIG. 13 is not given here.

Figure 14:
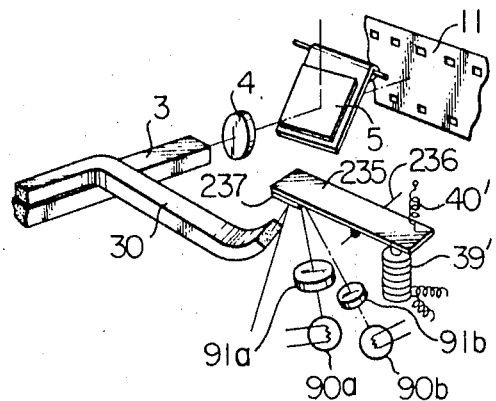
FIG. 14 is a fragmentary perspective view showing a modification of the device of FIG. 12 in which a light source for viewing the object to be inspected is provided separately from the light source for photographing the object.

FIG. 14 shows a modification of FIG. 12 in which lamp 90a for exposure of film 11 and lamp 90b for observation are provided in place of a single lamp 90 in FIG. 12. In this embodiment, electromagnet 39' is actuated in such a manner that it is energized to attract member 235 when the automatic exposure control of the film is to be effected while electromagnet is deenergized when the endoscope is used for the observation of the object. As is clear from FIG. 14, when electromagnet 39' is energized in timed relation to the actuation of mirror 5, member 235 is attracted to be swung about shaft 236 against the action of spring 40' to a position at which the light emanating from lamp 90a and passing through condenser lens 91a is reflected by mirror 237 toward the rear end surface of light conducting fiber optical system 30 for exposure of the film, while member 235 is returned to the initial position by the action of spring 40' at which the light emanating from lamp 90b and passing through condenser lens 91b is reflected by mirror 237 toward the rear end surface of light conducting fiber optical system 30 for viewing. In this embodiment, contacts 20, 21, 22 and contacts 92, 93 are omitted from the electric circuit because it is not necessary to selectively energize lamps 90a and 90b and the light to be received by the rear end surface of light conducting fiber optical system 30 can be switched immediately from the light from lamp 90a to that from 90b and vice versa by the action of member 235.

Figure 15:
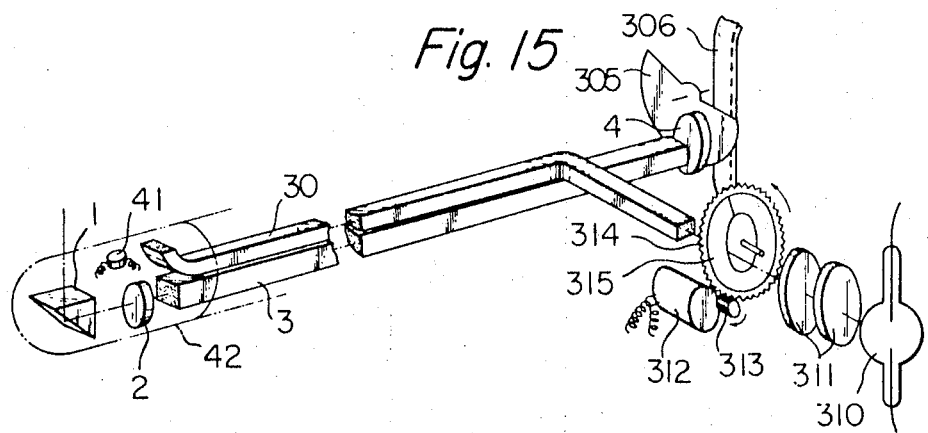
FIG. 15 is a schematic perspective view showing still another embodiment of the automatic exposure control device of an endoscope in accordance with the present invention for taking cinematographic film.
Figure 16:
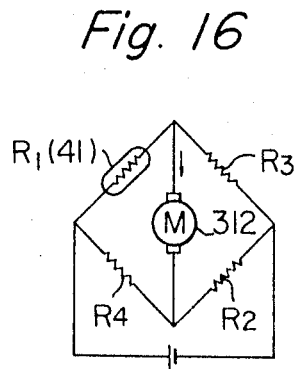
FIG. 16 is a diagram showing an embodiment of the balancing circuit used in the device of FIG. 15.

FIG. 15 shows another embodiment of the present invention adapted to be used in an endoscope for taking cinematographic pictures. The main parts of the endoscope in this embodiment are similar to the preceding embodiments. In this embodiment, however, rotating sector 305 is provided behind objective lens 4 and film 306 is transported at a position behind sector 305 in the direction transverse to the optical axis of objective lens 4 in timed relation to the rotation of sector 305 in a way similar to that of a conventional cine camera. The light from an external light source such as Xenon lamp 310 passes through condenser lens 311 and variable density filter 315 as described below toward the rear end surface of light conducting fiber optical system 30. The density of filter 315 is continuously or stepwise varied along the circumferential direction of filter 315. Instead of varying the density of filter 315, a plurality of small holes can be provided in a opaque disc, and the total area of holes is varied along the circumferential direction of the disc in order to achieve the same effect as that of filter 315. Pinion 313 secured to the shaft of reversible DC motor 312 meshes with gear 314 provided in the periphery of said variable density filter 315 so that, when motor 312 is rotated, filter 315 is driven so as to change the density of the portion of filter 315 through which the light from lamp 310 passes so that the intensity of the light illuminating the object is varied. In order to achieve the automatic control of the proper exposure of the film, a balancing circuit as shown in FIG. 16 is provided. In this circuit, $R_1$ designates the resistance of photoelectric element 41.

When the object is illuminated by lamp 310 through light conducting fiber optical system 30, the balancing circuit is balanced and motor 312 is stopped, if the following relation is satisfied:

$$R_1 = (R_3 \cdot R_4 1 R_2 \quad (1)$$

where $R_2$, $R_3$, $R_4$ are resistances provided in the respective branches of the circuit, respectively. Therefore, when the distance between the object and the objective lens is made small and the intensity of the light incident to objective lens 2 as well as to photoelectric element 41 is increased, value $R_1$ of photoelectric element 41 is reduced so that the balance of the circuit is broken and motor 312 is rotated in one direction until the balancing of the balancing circuit is established by the change in density of filter 315 caused by the rotation of motor 312. The direction of the rotation of motor 312 is so selected that the rotation of filter 315 driven by motor 312 increases the density of the portion of filter through which the light from lamp 310 passes when the intensity of the light incident to photoelectric element 41 and hence, to objective lens 2 increases. Therefore, the intensity of light illuminating the object is decreased and, thus, value $BR_1$ of photoelectric element 41 is increased to reach the initial value so that balancing is achieved in the circuit thereby stopping motor 312, thus permitting the proper exposure of the film. In like manner the circuit is balanced when the distance between the object and the objective lens is increased so as to obtain the proper exposure of the film.

Thus, if the range of variation in the density of filter 315 is so selected that the intensity of the light incident to the film from the object through image transmitting optical system 3 can be made appropriate for the proper exposure of the film when the following relation is satisfied:

$$R_1 \times R_2 = R_3 \times R_4,$$

then uniform and proper exposure of the film is assured by the device of FIG. 15.

Figure 17:
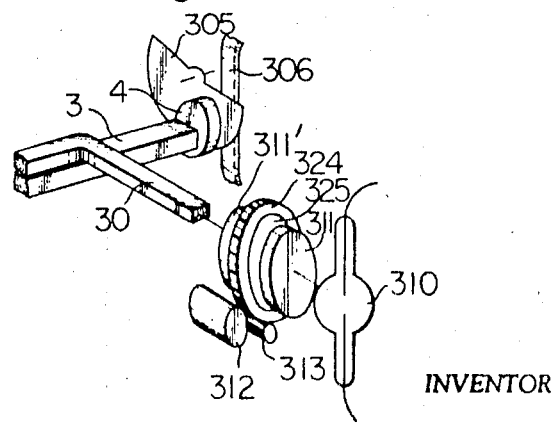
FIG. 17 is a fragmentary perspective view showing a modification of the device of FIG. 15.

FIG. 17 shows a modification of FIG. 15 in which variable iris stop 325 is used in place of variable density filter 315. Iris stop 325 is interposed between condenser lenses 311 and 311'. Pinion 313 of motor 312 meshes with gear 324 provided in the periphery of iris stop 325 so that the aperture of stop 325 is varied when motor 312 is rotated.

Figure 18:
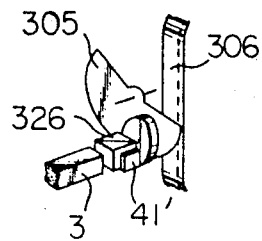
FIG. 18 is a fragmentary perspective view showing a modification of the device of FIG. 15 in which the photoelectric element of the electric circuit in the automatic exposure control device is located behind of the image transmitting optical system.

Photoelectric element 41 may be replaced by photoelectric element 41' located at the side of semitransparent prism 326 which is located behind the rear end of image transmitting optical system 3 as shown in FIG. 18.

Figure 19:
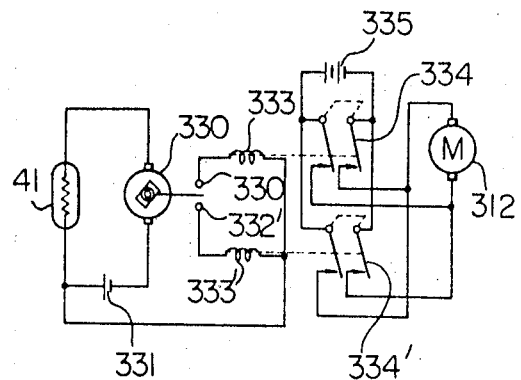
FIG. 19 is a diagram similar to FIG. 16 but showing another embodiment of the electric circuit of the automatic exposure control device of FIG. 15.

FIG. 19 shows another electric circuit for actuating motor 312. In this circuit, photoelectric element 41 and galvanometer 330 is connected in series to battery 331. Battery 331 is also selectively connectable to relay 333 or 333' through contact 332 or 332' selectively engageable with the pointer of meter 330. Contacts 334 and 334' for switching the direction of the rotation of motor 312 are coupled to relays 333 and 333', respectively. Electric power source 335 is connected in the circuit for driving motor 312 as shown. As is clear from FIG. 19, motor 312 is stopped for the proper exposure of the film when pointer of meter 330 comes to its neutral position in response to the signal from photoelectric element 41.

Figure 20:
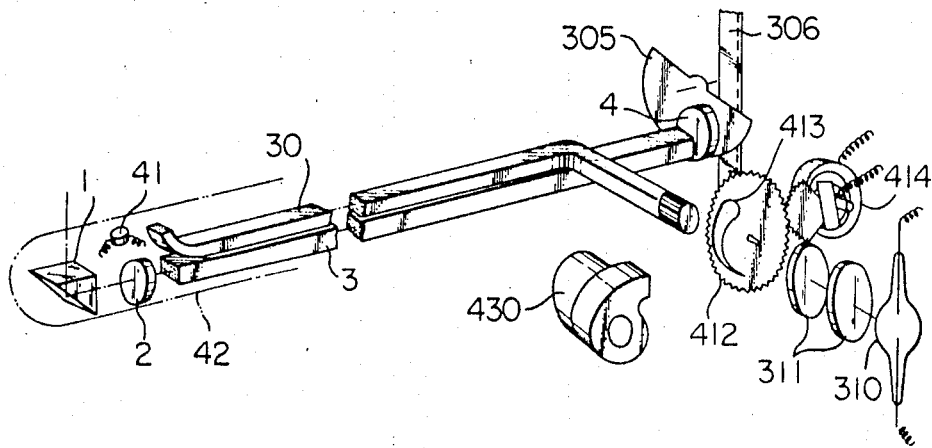
FIG. 20 is a schematic perspective view similar to FIG. 15 but showing another embodiment of the automatic exposure control device of the present invention.

FIG. 20 shows a modification of the device shown in FIGS. 15 and 17, in which a diaphragm disc 412 having therein an elongated diaphragm opening 413 of varying width along the circumferential direction of disc 412 is provided in place of variable density filter 315 in FIG. 15 or iris stop 325 in FIG. 17, and diaphragm disc 412 is rotated by a gavanometer 4414 actuated by the exposure control circuit in the device of FIG. 20 so that the proper exposure of film 306 is achieved.

Figure 21:
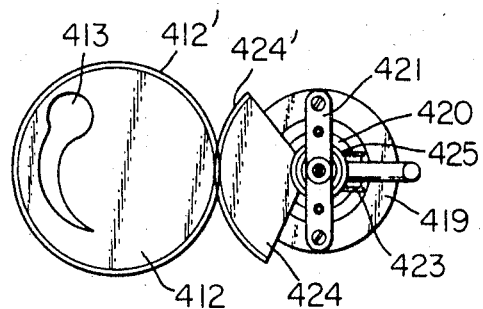
FIG. 21 is a fragmentary view showing the arrangement of the diaphragm plate and the sector gear attached to the galvanometer of the electric circuit in the device of FIG. 20.

As shown in FIG. 20, when disc 412 is rotated, the area of the portion of opening 413 which is in alignment with the rear end surface of light conducting fiber optical system 30 is varied. The light from lamp 310 is directed through condenser lenses 311 and diaphragm opening 413 of disc 412 to the rear end surface of light conducting fiber optical system 30. The periphery of disc 412 is provided with gear teeth 412' as shown in FIG. 21. Gear teeth 412' meshes with teeth 424' of sector gear 424 secured to the pointer of galvanometer 412. Thus, diaphragm disc 412 is rotated in accordance with the actuation of meter 414 through sector gear 424 and gear teeth 412'. The intensity of the light emanating from lamp 310 and incident to the rear end surface of light conducting fiber optical system 30 through condenser lenses 311 is the highest at center of the light bundle from lamp 310. Therefore, it is preferable to use elongated diaphragm opening 413 rather than a circular iris stop in order to evenly distribute the light over the entire area of the rear end surface of light conducting fiber optical system 30. However, diaphragm opening 413 causes partially nonuniform distribution of the intensity of the light incident to the rear end surface of light conducting fiber optical system 30. Therefore, in accordance with the present invention, the arrangement of the fibers of light conducting fiber optical system 30 at the rear end surface thereof is made random with respect to the arrangement of the fibers at the forward end surface so that the uniform distribution of the light is obtained at the forward end surface of light conducting fiber optical system 30.

Figure 22:
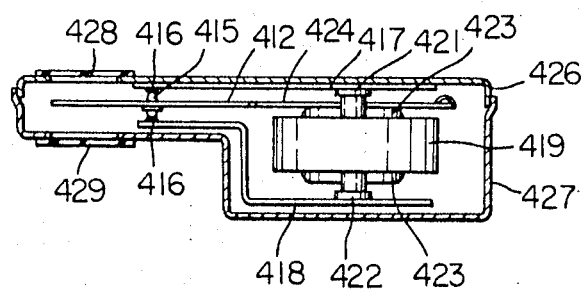
FIG. 22 is a view partly in cross section showing the arrangement of the diaphragm plate and the galvanometer shown in FIG. 21.
Figure 24:
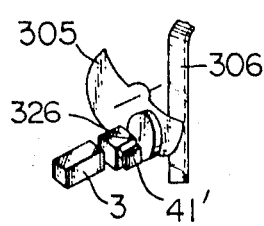
FIG. 24 is a fragmentary perspective view showing a modification of the arrangement of the photoelectric element of FIG. 20.

FIGS. 21, 22 show the detailed construction of the assembly of galvanometer 414 and diaphragm disc 412 shown in FIG. 20. Shaft 415 of diaphragm disc 412 is rotatably supported by bearings 416 fixed to base plates 417, 418, respectively. Yoke 419 of meter 414 is also secured through plates 421, 422 to base plates 417, 418, respectively. Sector gear 424 is rotatable together with moving coil 423 of meter 414. Permanent magnet 420 is provided in meter 414 in the conventional manner. The assembly is airtightly enclosed by upper and lower casing halves 426, 427. Casing halves 426, 427 are made of suitable material such as aluminum sheet having high thermal conductivity. Glass plates 428, 429 are secured to openings in casing halves 426, 427, respectively, so that the light from lamp 310 passes through the casing formed by casing halves 426, 427 and diaphragm opening 413 of disc 412 toward the rear end surface of light conducting fiber optical system 30. Sector gear 424 is made of a suitable material which hardly conducts heat generated in diaphragm disc 412 by the illumination of the light incident thereto to meter 414. Link means may be used in place of gears 412', 424' so as to couple meter 414 with diaphragm disc 412. Cooling fan 430 shown in FIG. 20 is located adjacent to the rear end surface of light conducting fiber optical system 30, the casing of the assembly of meter 414 and diaphragm disc 412 so as to cool them. Since the casing formed by upper and lower casing halves 426, 427 is made airtight, the cooling air does not influence the precise movement of meter 414. FIG. 24 shows photoelectric element 41' located at the side of semitransparent prism 326 which is positioned between the rear end surface of image transmitting optical system 3 and objective lens 4 in the like manner as shown in FIG. 18.

Figure 23:
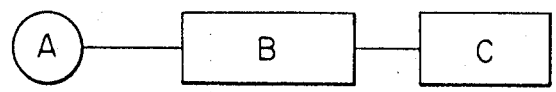
FIG. 23 is a block diagram showing the connection of the electrical connection of the automatic exposure control system of the device of FIG. 20.

FIG. 23 shows the block diagram of the electric circuit used in the embodiment of FIG. 20. Reference symbol A indicates photoelectric element 41 or 41', and B indicates DC amplifier while C indicates the automatically actuated diaphragm regulating means such as the assembly shown in FIG. 21.

In operation, the signal generated in photoelectric element 41 or 41' in response to the light incident thereto is supplied to DC amplifier B and the output of amplifier B actuates meter 414. When the intensity of the light from the object is higher than the predetermined value, the output of photoelectric element 41 increases thereby increasing the output of amplifier B so that diaphragm disc 412 is rotated clockwise to decrease the aperture of opening 413. In like manner, when the intensity of the light from the object is low, the aperture of opening 413 is increased by the rotation of disc 412 in the anticlockwise direction. Therefore, automatic exposure control is achieved. Photoconductive element such as CdS element may be used together with a power source in place of said photoelectric element.

Figure 25:
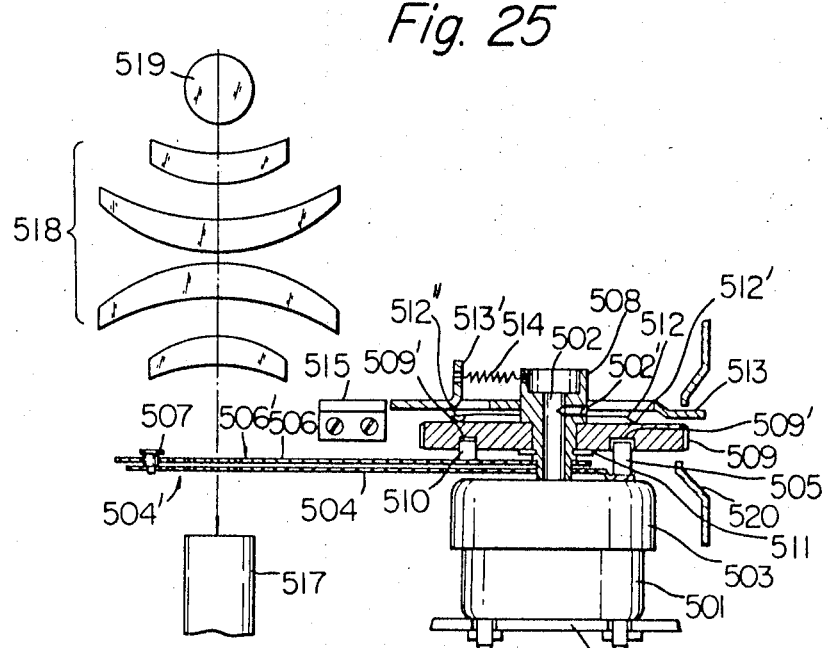
FIG. 25 is a view partly in cross section showing a further embodiment of the present invention in which the intensity of the light illuminating the object for viewing thereof can be manually adjusted.
Figure 26:
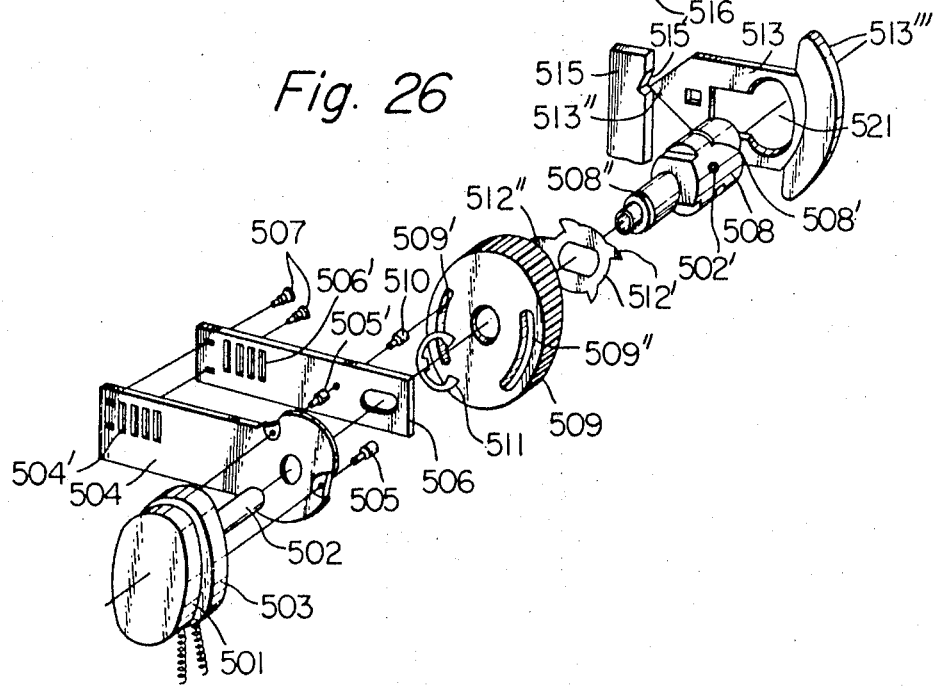
FIG. 26 is an exploded perspective view showing the construction of the device of FIG. 25.

FIGS. 25 and 26 show a still further embodiment of the present invention in which the intensity of the light for the observation of the object is manually adjusted while the intensity of the light for the exposure of the film is automatically controlled for obtaining the proper exposure of the film.

In the embodiment shown in FIGS. 25 and 26, rotary solenoid 501 is fixedly secured to a plate 516 fixed to the base plate not shown. Shaft 502 of rotary solenoid 501 is rotatable together with dust protecting cover 503. Stationary light intercepting plate 504 provided with a plurality of small elongated slits 504' is secured to cover 503 by means of set screws 505 and 505'. Movable light intercepting plate 506 also provided with a plurality of small elongated slits 506' corresponding to slits 504' is located adjacent to plate 504 so as to be moved relative to plate 504, the size and arrangement of slits 506' being made to correspond to slits 504', thus permitting the adjustment of the intensity of light passing through slits 504', 506' for the observation purpose by adjustably move plate 506 relative to plate 504. Set screws 507 pass through elongated holes in plate 506 and fixedly screwed into plate 504. Bush 508 is fixedly secured to shaft 502. Holes in plates 504, 506 and knurled knob 509 are fitted on bush 508. Since the hole in plate 506 which is fitted on bush 508 is an elongated hole, plate 506 is shiftable relative to plate 504 with set screws 507 and bush 508 guiding plate 506 so that plate 506 can only move in the longitudinal direction of plates 504 and 506 thereby varying the total area of superposed slits 504' and 506' depending upon the relative position of plates 504 and 506. Knob 509 is provided with slit 509' in spiral form with respect to the center of knob 509 and slit 509'' in circular form about the center of knob 509 as shown. The head of set screw 505 is loosely fitted in slit 509'' to limit the range of rotation of knob 509, while the head of screw 510 secured to plate 506 is fitted in spiral slit 509' so that, when knob 509 is rotated, plate 506 is moved relative to plate 504 by virtue of the engagement of screw 510 with spiral slit 509'. Hole 521 in the form of key hole provided in stopper 513 is slidably fitted with grooves 508' in bush 508 so that stopper 513 and bush 508 are rotatable together. However, stopper 513 is normally biased toward the right by the action of spring 514 which is secured at its one end to lug 513' of stopper 513 and at its other end to bush 508. Thus, when stopper is urged toward the left against the action of spring 514, pointed tip 513" of stopper 513 engages with V-shaped groove 515' in stopper plate 515 fixed to the base plate so that stopper 513 together with bush 508 is prevented from being rotated by virtue of the engagement of key-shaped hole 521 of stopper 513 with grooves 58' in bush 508. As seen from FIG. 25, outer edge 513''' of stopper 513 projects beyond the knurled outer periphery of knob 509, therefore, stopper 513 is first moved to engage with stopper plate 515 when knob 509 is to be rotated by hand from the exterior as seen in FIG. 25. This assures that bush 508 and, hence, shaft 502 together with plates 504, 506 is positively prevented from being rotated about the axis of shaft 502 while the relative positions of plates 504 and 506 are adjusted by rotating knob 509 so that the total clearance area formed by superposed slits 504' and 506' is varied. Spring washer 512 having bent projections at the periphery thereof serves to frictionally hold knob 509 relative to bush 508 while E ring 511 fitting with groove 508" in bush 508 prevents knob 509 from being disassembled. Raised portion 512" in spring washer 512 serves to snugly fit with one of a plurality of holes provided in the side surface of knob 509 so as to arrest knob 59 at a selected rotational position for releasably setting the desired clearance area formed by the superposition of slits 504' and 506'.

When the exposure of the film is to be effected, plates 504, 506 are rotated about the axis of shaft 502 by the actuation of rotary solenoid 501 so that plates 504, 506 are moved out of the optical path between lamp 519 and the rear end surface of light conducting fiber optical system 517, condenser lenses 518 being located in front of lamp 519. After the expiration of the time determined by the exposure control circuit, plates 504, 506 are returned to their light intercepting positions by the actuation of rotary solenoid 501 in a similar manner as in the preceding embodiments so that an appropriate intensity of light for the observation of the object is obtained.

Figure 27:
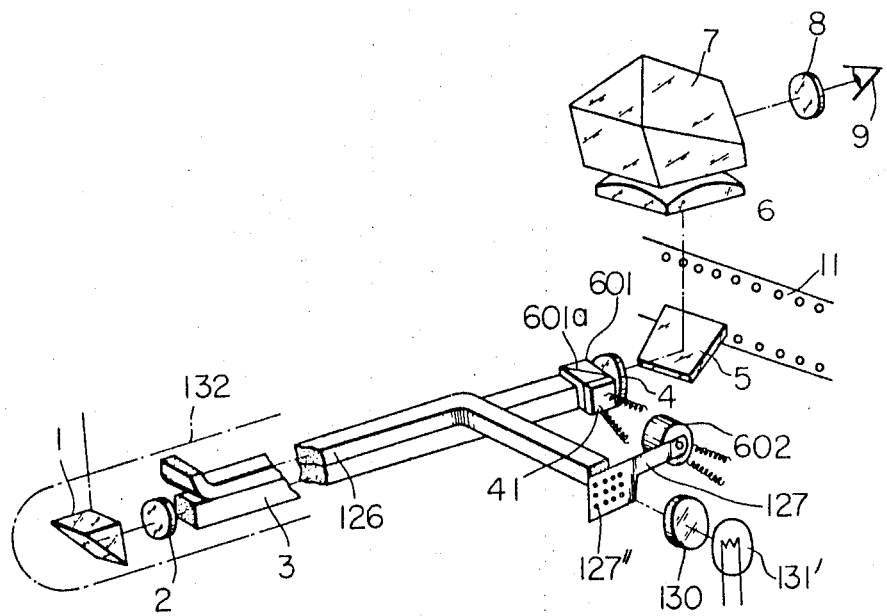
FIG. 27 is a schematic perspective view showing still a further embodiment of the present invention in which the light received by the photoelectric element is selected to have particular spectroscopic characteristics effective for actuating the photoelectric element but substantially ineffective for the exposure of the film so that it is actuated most effectively while substantial loss of the quantity of light for the exposure of the film is prevented.

Referring to FIG. 27 showing a still further embodiment of the present invention, the endoscope shown therein is similar in construction and operation to that illustrated in FIGS. 9 and 11 except that photoelectric element 41 is attached to a beam splitter 601 having a semitransparent coating 601a and located behind the rear end surface of image transmitting optical system 3 so as to receive a portion of light emanating from the rear end surface of image transmitting optical system 3 while the remaining portion of the light is directed through another objective lens 4 for the exposure of film 11 or for the observation of the image of the object by the eye 9 of the operator through prism 7 and ocular 8 and that light intercepting blade 127 is actuated by a rotary solenoid 602 actuated by the exposure control means. Mirror 5 is normally in the observing position as shown while light intercepting blade 127 is in its light intercepting position as shown with a fraction of the light from lamp 131' passing through small holes 127" in blade 127 so as to be received by light conducting optical system 126 so that the object is illuminated for observation. When the exposure of the film is to be effected, mirror 5 is swung to its film exposing position by the actuation of release means coupled with the exposure control means in timed relation to the operation of light intercepting blade 127 by means of rotary solenoid 602 energized by the exposure control means so that the light of high intensity is supplied to light-conducting optical system 126 so as to illuminate the object for the exposure of the film. After a predetermined time as set in the the exposure control means in accordance with the signal supplied from photoelectric element 41 receiving a portion of light directed to film 11 as described above, rotary solenoid 602 moves blade 127 back to its light intercepting position and thereafter mirror 5 is returned to this observing position in like manner as described in connection with FIG. 9 thereby terminating the exposure of the film for the proper exposure thereof. A conventional single reflex camera may be incorporated in the device shown in FIG. 27 in like manner as described previously.

Figure 28:
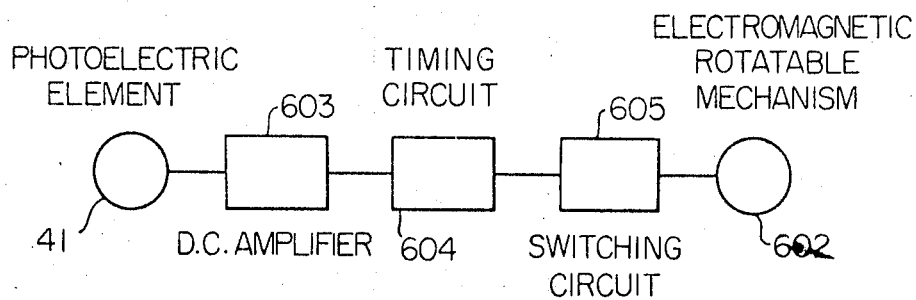
FIG. 28 is a block diagram showing the electric circuit used in the device of FIG. 27.
Figure 28:

FIG. 28 shows a block diagram of the exposure control means used in the device shown in FIG. 27. By operating the release means, mirror 5 is swung to its film exposing position and the exposure control means is actuated so as to actuate rotary solenoid 602 to move light intercepting blade 127 out of the optical path between lamp 131' and the rear end of light conducting optical system 126. The signal of photoelectric element 41 is amplified by DC amplifier 603 and is supplied to timing circuit 604 in which a time instant is set in accordance with the signal supplied from photoelectric element 41 for determining the proper exposure of the film. Thus, light intercepting blade 127 is returned to its light intercepting position by rotary solenoid 602 after the time as set in timing circuit 604 for the proper exposure of the film by the actuation of switching circuit 605 receiving the output of timing circuit 604, rotary solenoid 602 shown as electromagnetic rotatable mechanism in FIG. 28 receiving the signal from switching circuit 605. Mirror 5 is returned to its observing position by freeing the release means after the proper exposure of the film as described previously.

In accordance with one of the characteristic features of the present invention, the spectroscopic characteristics of semitransparent coating 601a of beam splitter 601 are so determined that only a portion of light from the object transmitted through image transmitting optical system 3 which has wavelengths substantially noneffective for the exposure of the film is directed to photoelectric element 41 by means of beam splitter 601 and the spectroscopic sensitivity of photoelectric element 41 is so selected that it has the highest sensitivity in the range of wavelengths which are substantially noneffective for the exposure of the film, the spectroscopic characteristics of the light source being selected appropriately so that the above described features are advantageously utilized.

Thus, photoelectric element 41 receives a portion of light from the object most effective for the actuation thereof but substantially noneffective for the exposure of the film while the remaining portion of light from the object from which only the light substantially noneffective for the exposure of the film is eliminated is directed to the film or to the eye for the most effective exposure of the film or for the most effective observation of the object.

Figure 29:
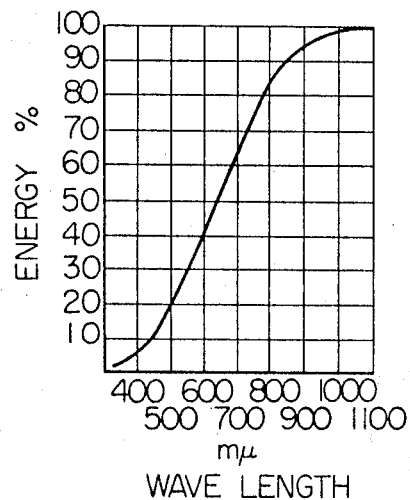
FIG. 29 is a graph showing the spectroscopic characteristics of a tungsten lamp.
Figure 30:
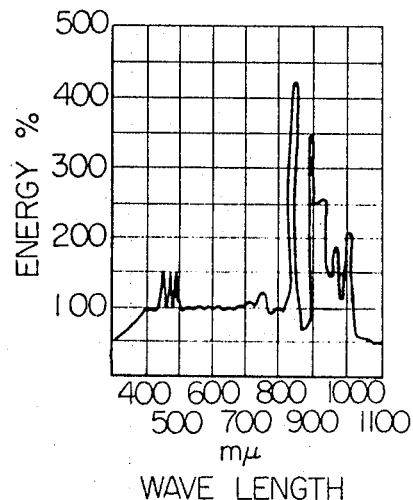
FIG. 30 is a graph similar to FIG. 29 but showing the spectroscopic characteristics of a xenon lamp.

FIGS. 29 and 30 show the spectroscopic characteristics of a tungsten lamp and a xenon lamp, respectively. As is evident from these figures, a tungsten lamp has a spectroscopic energy distribution having a high energy percentage in the range of wavelengths of infrared light greater than 700 $\mu$ while a xenon lamp has a spectroscopic energy distribution having peaks of energy percentage in the range of wavelengths of 800 — 1000 $\mu$.

Figure 31:
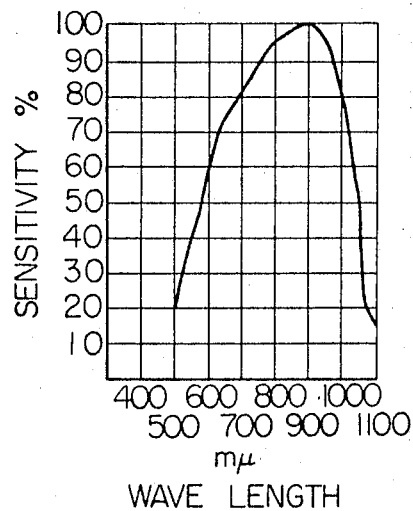
FIG. 31 is a graph showing the spectroscopic sensitivity of a silicon photoelectric element.

On the other hand, a silicon photoelectric transducing element has a spectroscopic sensitivity having its peak in the range of wavelengths of 900 $\mu$ as shown in FIG. 31. Therefore, such a photoelectric element can be used effectively together with a tungsten lamp of a xenon lamp.

Figure 32:
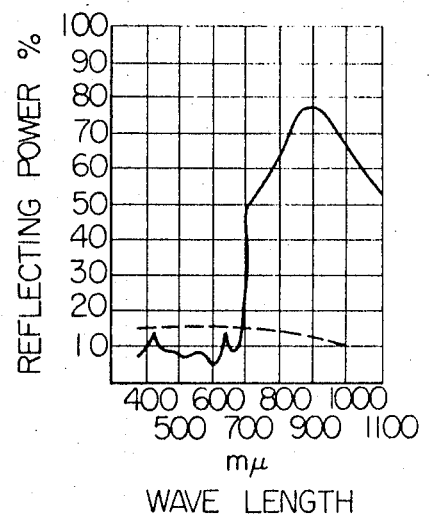
FIG. 32 is a graph showing the spectroscopic reflecting power of the semitransparent coating of the beam splitter used in the present invention in comparison with the spectroscopic reflecting power of a semitransparent coating of ZnS.

In accordance with the present invention, a semitransparent coating made of multilayer coating of $MgF_3$ and $ZnS$ is used in beam splitter 601. The spectroscopic reflecting power of the multilayer coating of $MgF_2$ and $ZnS$ is shown by the solid line of FIG. 32. As shown, the reflecting power has its peak in the range of wavelengths of 900 $\mu$.

Thus, when a tungsten lamp or a xenon lamp is used as the light source and the multilayer semitransparent coating such as made of $MgF_2$ and $ZnS$ is used in beam splitter 601 while a silicon photoelectric element is used as photoelectric element 41, a portion of light from the object which is effective for the actuation of the photoelectric element but noneffective for the exposure of the film is directed to the photoelectric element for the effective energization thereof while the remaining portion of light from which only the light noneffective for the exposure of the film is eliminated is used effectively for the exposure of the film or the observation of the object. A film has usually a spectroscopic sensitivity effective in the range of visible light, therefore, the exposure of the film is effectively carried out even though a portion of light having wavelengths in the range of infrared light is eliminated.

Mucous membranes of human body and the like to be inspected by the endoscope are red, therefore, the present invention as described above is particularly useful to inspect the mucous membranes.

Since the output of the photoelectric element can be made great and the magnification power of the amplifier can be lowered, the S/N ratio can be made better and the drift of the semiconductors used in the exposure control means can be made small thereby permitting the performance of the exposure control means to be raised.

We claim:

1. Automatic exposure control device in an endoscope having a control housing, a first objective lens located in a forward end portion of the endoscope, a tube connecting said forward end portion to said control housing, an image transmitting optical system extending through said tube and having a forward and a rear end surface, another objective lens located behind the rear end of said image transmitting optical system, a film loaded in said endoscope, said first objective lens being arranged to focus an image of an object on the forward end surface of said image transmitting optical system so that the image is transmitted therethrough to its rear end surface, said other objective lens being arranged to focus the thus transmitted image on said film, exposure control means for controlling the exposure of the film, a light conducting optical system extending through said tube and having a rear end surface and a forward end, an external light source, said external light source being arranged to supply illuminating light to the rear end surface of said light conducting optical system so that the light is transmitted therethrough to its forward end thereby permitting the object to be illuminated by the light emanating from the forward end of said light conducting system, wherein the improvement comprises means located in the optical path between said external light source and said rear end surface of said light conducting optical system for controlling the light supplied from said external light source to said rear end surface of said light conducting optical system for the exposure of the film, electrical means operably coupled with said means for controlling the light and connected to said exposure control means so as to be actuated thereby for actuating said means for controlling the light, and a photoelectric element connected to said exposure control means which is adapted to receive the light reflected from the object and which, when the light is under the condition for the exposure of the film, produces a signal indicative of the intensity of the light for the exposure of the film thereby permitting a time constant for the proper exposure of the film to be set in said exposure control means in accordance with the intensity of the light for the exposure of the film incident to said photoelectric element so that said electrical means is actuated in accordance with said time constant for actuating said means for controlling the light for obtaining the proper exposure of film.

2. The automatic exposure control device of claim 1, wherein the light controlling means comprises a light intercepting blade movably located in the optical path, the electrical means comprises a solenoid in the exposure control means and driving said blade, a release means is arranged for energizing the solenoid so that said blade is moved out of said optical path thereby permitting the object to be illuminated, and deenergization of the solenoid according to said time constant moving the blade into said optical path to intercept the light.

3. The automatic exposure control device of claim 2, wherein said light source normally emanates light of low intensity, and further comprising an ocular means in said control housing for permitting the object to be viewed therethrough, the intensity of the light of said light source being increased for the exposure of the film by the first part of the operation of said release means in timed relation to the movement of the blade into said optical path thereby intercepting the light incident to the rear end surface of said light conducting optical system until the intensity of the light is increased so that the color temperature of the light is made stable, said solenoid being deenergized by the last part of the operation of the release means thereby permitting said blade to be moved out of said optical path so that light of high intensity is directed to the rear end surface of said light conducting optical system so as to illuminate the object for the exposure of the film.

4. Device according to claim 3, wherein means is provided to switch the optical path leading to said ocular means to said film in timed relation to the operation of said exposure control means.

5. Device according to claim 3, wherein another light source is provided for emanating the light of low intensity so that the object is viewed through said ocular means except for the time when the exposure of the film is affected.

6. Device according to claim 5, wherein means is provided to switch the optical path leading to said ocular means to said film in timed relation to the operation of said exposure control means.

7. Device according to claim 5, wherein said blade has at least one small hole for passing therethrough a fraction of the light emanating from said other light source.

8. Device according to claim 7, wherein means is provided to switch the optical path leading to said ocular means to said film in timed relation to the operation of said exposure control means.

9. The automatic exposure control device of claim 1, wherein the light controlling means comprises a light intercepting swingable member, and a mirror is mounted on the swingable member for movement between a first position for reflecting the light from the light source to the rear end surface of said light conducting optical system and a second position for reflecting the light from the light source out of said rear end surface, said exposure control means actuating the mirror movement.

10. Device according to claim 9, wherein the electrical means comprises a solenoid in the exposure control means and driving the swingable member, a release means is arranged for energizing and deenergizing the solenoid, the light source including a first light source of low intensity and a second light source of high intensity, the mirror in said first position reflecting the light from said second light source and in said second second position reflecting the light from said first light source, and further comprising an ocular means in said control housing whereto the light from the first light source is reflected in said second position to permit the object to be viewed.

11. Device according to claim 10, wherein means is provided to switch the optical path leading to said ocular to said film in time relation to the operation of said exposure control means.

12. The automatic exposure control device of claim 1, further comprising a beam splitter located in the optical path between the rear end of said image transmitting optical system and said film, the photoelectric element being adapted to receive a portion of the light reflected from the object through said beam splitter, a release means coupled with said exposure control means for the operation thereof for actuation of the light controlling means, and the beam splitter including a semitransparent coating having spectroscopic characteristics allowing a portion of the light from the object having wave lengths longer than those of visible light to be directed to said photoelectrical element while the remaining portion of the light is directed to he film by means of the beam splitter, the spectroscopic sensitivity of said photoelectric element being selected to have maximum sensitivity in the range of the wavelengths of infrared light.

13. Device according to claim 12, wherein said light controlling means is comprised of a movable blade adapted to be moved out of the optical path in response to the actuation of said release means so as to permit the exposure of the film and moved into the optical path by the operation of said exposure control means so as to terminate the exposure of the film for the proper exposure thereof, said blade being provided with at least one small hole which permits a fraction of the light from the light source when said blade is located in the optical path thereby permitting said fraction of the light to be used for the observation of the object by switching the optical path from the film to the ocular.

14. Device according to claim 12 wherein said photoelectric element is a silicon photoelectric transducing element and said semitransparent coating of said beam splitter is made of multilayer coating comprising layers of $MgF_2$ and ZnS.

15. Automatic exposure control device according to claim 1, wherein said photoelectric element is attached to a beam splitting optical means located between the rear end of said image transmitting optical system and said another objective lens so as to be supplied with a portion of light for focusing the image of the object on the film by means of said beam splitting optical means.